(12) United States Patent  
Sieder et al.

(10) Patent No.: US 12,043,809 B2  
(45) Date of Patent: Jul. 23, 2024

(54) PROCESS FOR PRODUCING A DEACIDIFIED FLUID STREAM

(71) Applicant: BASF SE, Ludwigshafen am Rhein (DE)

(72) Inventors: Georg Sieder, Ludwigshafen am Rhein (DE); Raquel Fernandez-Rodiles, Florham Park, NJ (US); Thomas Ingram, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 758 days.

(21) Appl. No.: 17/251,001

(22) PCT Filed: May 31, 2019

(86) PCT No.: PCT/EP2019/064160  
§ 371 (c)(1),  
(2) Date: Dec. 10, 2020

(87) PCT Pub. No.: WO2019/238432  
PCT Pub. Date: Dec. 19, 2019

(65) Prior Publication Data  
US 2021/0147757 A1  May 20, 2021

(30) Foreign Application Priority Data

Nov. 6, 2018  (EP) ..................................... 18176959  
Nov. 6, 2018  (EP) ..................................... 18176963

(51) Int. Cl.  
*C10L 3/10* (2006.01)  
*B01D 5/00* (2006.01)  
(Continued)

(52) U.S. Cl.  
CPC ............ *C10L 3/101* (2013.01); *B01D 5/0003* (2013.01); *B01D 53/002* (2013.01);  
(Continued)

(58) Field of Classification Search  
None  
See application file for complete search history.

(56) References Cited

U.S. PATENT DOCUMENTS 3,288,557 A    11/1966   Bresler  
9,295,942 B2    3/2016   Katz et al.  
(Continued)

FOREIGN PATENT DOCUMENTS

CA          873791 A      6/1971  
DE    102005033837 A1    1/2007  
(Continued)

OTHER PUBLICATIONS

English language machine translation for RU 2602908. Retrieved from translationportal.epo.org on Sep. 18, 2023. (Year: 2023).*

(Continued)

*Primary Examiner* — Jason M Greene  
(74) *Attorney, Agent, or Firm* — Faegre Drinker Biddle & Reath LLP (57) ABSTRACT

A process for producing a deacidified fluid stream from a fluid stream comprising methanol and at least one acid gas, comprising
- a) an absorption step in which the fluid stream is contacted with an absorbent in an absorber to obtain an absorbent laden with methanol and acid gases and an least partly deacidified fluid stream;
- b) a regeneration step in which at least a portion of the laden absorbent obtained from step a) is regenerated in a regenerator to obtain an at least partly regenerated absorbent and a gaseous stream comprising methanol and at least one acid gas;
- c) a recycling step in which at least a substream of the regenerated absorbent from step b) is recycled into the absorption step a);

(Continued)

d) a condensation step in which a condensate comprising methanol is condensed out of the gaseous stream from step b);

wherein the regenerator additionally comprises a rescrubbing section, and the condensate from step d) is recycled into the regenerator partly in the upper region of the rescrubbing zone or above the rescrubbing zone.

14 Claims, 5 Drawing Sheets

(51) Int. Cl.
  *B01D 53/00* (2006.01)
  *B01D 53/14* (2006.01)
(52) U.S. Cl.
  CPC ..... *B01D 53/1425* (2013.01); *B01D 53/1456* (2013.01); *B01D 53/1475* (2013.01); *B01D 53/1487* (2013.01); *B01D 53/1493* (2013.01); *C10L 3/102* (2013.01); *C10L 3/103* (2013.01); *C10L 3/104* (2013.01); *B01D 2252/20431* (2013.01); *B01D 2252/20447* (2013.01); *B01D 2252/20489* (2013.01); *B01D 2257/102* (2013.01); *B01D 2257/602* (2013.01); *B01D 2257/80* (2013.01); *C10L 2290/08* (2013.01); *C10L 2290/44* (2013.01); *C10L 2290/541* (2013.01)

(56) References Cited

U.S. PATENT DOCUMENTS

| | | | |
|---|---|---|---|
| 9,399,188 | B2 | 7/2016 | Miyamoto et al. |
| 2002/0059865 | A1 | 5/2002 | Lemaire et al. |
| 2004/0065199 | A1 | 4/2004 | Rojey et al. |
| 2010/0319540 | A1* | 12/2010 | Garcia Andarcia ......................... B01D 53/1456 95/180 |
| 2014/0065040 | A1* | 3/2014 | Katz .................. B01D 53/1456 423/210 |
| 2014/0135534 | A1* | 5/2014 | Bischoff ................. B01B 1/005 252/373 |
| 2014/0366577 | A1* | 12/2014 | Zubrin ...................... C10L 3/10 62/619 |
| 2015/0030516 | A1 | 1/2015 | Higashi et al. |
| 2015/0316415 | A1* | 11/2015 | Islam ................... A61B 5/7257 250/338.4 |
| 2016/0215119 | A1 | 7/2016 | Wagner et al. |

FOREIGN PATENT DOCUMENTS

| | | | | |
|---|---|---|---|---|
| EP | 3315591 | A1 | 5/2018 | |
| RU | 2602908 | C1 * | 11/2016 | ............. B01D 53/14 |
| WO | 2016/055196 | A1 | 4/2016 | |
| WO | 2016/081010 | A1 | 5/2016 | |
| WO | 2016/150786 | A1 | 9/2016 | |

OTHER PUBLICATIONS

International Search Report for PCT Patent Application No. PCT/EP2019/062140, Issued on Jul. 17, 2019, 4 pages.

Koichiro, et al., "Enzyme-catalyzed asymmetric hydrolysis of mesa-substrate. The Facile Synthesis of Both Enantiomers of cis-2,5-Disubstituted Tetrahydrofuran Derivatives", Chemistry Letters, vol. 17, Issue 10, 1988, pp. 1717-1720.

Alexandre Terrigeol, "Molecular Sieves Contaminants: Effects, Consequences and Mitigation", Gas Processors Association—Europe, May 23-25, 2012, 14 pages.

European Search Report for EP Patent Application No. 18176959.7, Issued on Dec. 4, 2018, 3 pages.

European Search Report for EP Patent Application No. 18176963.9, Issued on Dec. 13, 2018, 3 pages.

Kenneth S. Pitzer, "Chapter 3—Ion Interaction Approach: Theory and Data Correlation", Activity Coefficients in Electrolyte Solutions, 2nd Edition, 1991, pp. 75-153.

Norbert Asprion, "Nonequilibrium Rate-Based Simulation of Reactive Systems:? Simulation Model, Heat Transfer, and Influence of Film Discretization", Industrial & Engineering Chemistry Research, vol. 45, Issue 6, Feb. 8, 2006, pp. 2054-2069.

International Preliminary Report on Patentability received for PCT Patent Application No. PCT/EP2019/064160, mailed on Apr. 15, 2020, 19 pages (5 pages of English Translation and 14 pages of Original Document).

International Search Report and Written Opinion received for PCT Patent Application No. PCT/EP2019/064160, mailed on Nov. 20, 2019, 19 pages (9 pages of English Translation and 10 pages of Original Document).

* cited by examiner

PROCESS FOR PRODUCING A DEACIDIFIED FLUID STREAM

CROSS-REFERENCE TO RELATED APPLICATIONS

This application is a national stage application (under 35 U.S.C. § 371) of PCT/EP2019/064160, filed May 31, 2019, which claims benefit of European Application Nos. 18176959.7, and 18176963.9, both filed Jun. 11, 2018, all of which are incorporated herein by reference in their entirety.

The present invention relates to a process for producing a deacidified fluid stream, especially for producing deacidified natural gas, having a low methanol content.

The removal of the acid gases from fluid streams is desirable for various reasons.

Natural gas obtained after production comprises, as well as methane, various other components such as further hydrocarbons, water, and acid gases, such as $CO_2$, $H_2S$ or mercaptans.

Crude natural gas has to be purified prior to sale as what is called sales gas, in order that it meets the specifications and demands of customers and the distribution companies.

For example, water has to be very substantially removed from natural gas since, in the event of inadequate drying of the natural gas, there can be formation of methane hydrates. The solid methane hydrates can contribute to an extreme pressure drop in the conveying conduits and block or even damage the valves and pipelines.

The drying also guarantees a uniform calorific value of the gas when it is fed into the public grid.

Moreover, acid gases such as $CO_2$, $H_2S$ and mercaptans must be removed since they are corrosive and can lead to corrosion damage in the pipelines or apparatuses in the crude natural gas processing plants. Moreover, they are, like $CO_2$ and $H_2S$, environmental pollutants that are significant causes of acid rain.

In the production of liquid natural gas (LNG), it is necessary to purify the crude natural gas prior to liquefaction; it is necessary inter alia to remove $CO_2$ down to 50 ppmv for it not to precipitate out in solid form in the liquefaction.

The crude natural gas therefore generally undergoes a multitude of purification steps before it is fed into the natural gas grid as sales gas.

Typically, a majority of the water present and natural gas condensate is initially removed. This is generally done by cooling the crude natural gas, so as to condense out water and the constituents that form the natural gas condensate, such as longer-chain alkanes and aromatics.

The liquids condensed out, i.e. the natural gas condensate and water, can be separated from the non-liquefied natural gas. Water and natural gas condensate are generally separated off at or close to the deposit.

In colder regions of the earth, methanol is typically added to the natural gas after the water and natural gas condensate have been separated off and before it is transported to a natural gas processing plant. Methanol acts as an inhibitor of the formation of methane hydrates in the crude natural gas. The addition of methanol to the crude natural gas thus enables the transport of the crude natural gas from the deposit to the natural gas processing plant at cold outside temperatures.

However, the addition of methanol to the crude natural gas can lead to problems in the downstream workup steps in a natural gas processing plant.

A natural gas processing plant generally comprises one or more of the following steps:
(i) deacidification;
(ii) dewatering;
(iii) removal of mercury;
(iv) removal of nitrogen;
(v) removal of natural gas condensates; and/or
(vi) liquefaction for production of LNG In the deacidification step (i), the crude natural gas is generally contacted with an absorbent that absorbs at least a portion of the acid gases, so as to obtain a deacidified natural gas and an absorbent laden with the acid gases.

In the deacidification step (i), the methanol present in the crude natural gas is generally not completely co-absorbed in the absorbent, such that the deacidified natural gas still comprises certain residual amounts of methanol before it is sent to the dewatering stage (ii). This may be the case especially when the absorbent itself comprises residual amounts of methanol. Residual amounts of methanol may be present in the absorbent when regenerated absorbent from which methanol has not been completely removed is used for deacidification.

However, residual amounts of methanol may lead to problems in the subsequent dewatering stage (ii).

The dewatering may be configured, for example, as a pressure swing adsorption (PSA), preferably as a temperature swing adsorption (TSA), or as a glycol drying operation.

If the dewatering (ii) is configured, for example, as a PSA or TSA in which a molecular sieve is used as solid desiccant, it is necessary in the case of presence of residual amounts of methanol to use a 4 A molecular sieve rather than a 3 A molecular sieve, which means that further components such as $H_2S$ and ethane are also absorbed as well as water and methanol. In addition, the absorption of methanol competes with the preferred absorption of water. The co-absorption of methane and other constituents by use of a larger molecular sieve requires the adsorber to be designed on a larger scale. Methanol may additionally lead to rapid coking of the molecular sieve in the regeneration of the molecular sieve by increasing the temperature.

Both in the case of an adsorption unit based on the PSA or TSA method and in the case of a dewatering unit based on what is called glycol dewatering, there may be entrainment of methanol through multiple plant components since the water separated off in the regeneration of the desiccant additionally comprises methanol.

The presence of methanol generally entails a further aftertreatment of the water separated off, in which methanol is separated from water, in order to recover methanol and/or water in a purity in which the substances can respectively be reused again as make-up water and inhibitor.

RU 2602908 therefore discloses a process for deacidification of crude natural gas in which a deacidified natural gas with a low MeOH content is obtained.

In this process, the MeOH-containing crude natural gas is first introduced into an absorber. In the absorber, the MeOH-containing crude natural gas is contacted with an aqueous amine solution. In this case, the predominant portion of the MeOH is also absorbed as well as the acid gases, such as $CO_2$. In a regenerator, the laden amine solution is regenerated at relatively high temperatures, with stripping of the acid gases and MeOH out of the laden amine solution. The stream obtained overhead in the regenerator is sent to a condenser in which the predominant proportion of methanol is condensed out together with the stripping steam and is separated from the acid gases remaining in the gas phase.

RU 2602908 discloses the further workup of the MeOH-containing condensate from the regenerator in a downstream distillation column. The regenerator condensate is separated therein into methanol (top product) and water (bottom product). The MeOH can then be reused as inhibitor in the crude natural gas. The virtually MeOH-free water is run into a buffer vessel, where it is mixed with the regenerated absorbent to compensate for water losses, and returned to the absorber.

A disadvantage of the process described in RU 2602908 is that the process described in RU 2602908 requires an additional distillation column. This increases operating costs and/or capital costs.

Similar problems can arise in the production of synthesis gas. For instance, in the production of synthesis gas by steam reforming of methane, methanol can be formed as by-product. The fluid stream may thus also include methanol as well as hydrogen and acid gases, such as $CO_2$ and CO. After at least a portion of the acid gases has been separated off by acid gas scrubbing, the deacidified synthesis gas and/or the deacidified hydrogen may also comprise residual amounts of methanol. Together with water, which can generally be introduced by an aqueous absorbent, the problems described above can likewise occur in the subsequent drying of the synthesis gas and/or hydrogen.

It was therefore an object of the present invention to produce a deacidified fluid stream, especially a deacidified natural gas, having a low MeOH content, wherein the production process required for the purpose was to have lower capital costs and operating costs.

More particularly, the present invention was to enable a high recovery rate of the methanol used as inhibitor.

In addition, it was to enable a reduction in the amounts of constituents of the absorbent, such as water, that have to be supplied in order to compensate for any losses in the process. For that reason, the process of the invention was to enable the recycling of streams from particular process steps into other process steps.

BRIEF SUMMARY OF THE INVENTION

The object of the present invention was achieved by a process for producing a deacidified fluid stream from a fluid stream comprising methanol and at least one acid gas, comprising
  a) an absorption step in which the fluid stream is contacted with an absorbent in an absorber to obtain an absorbent laden with methanol and acid gases and an at least partly deacidified fluid stream;
  b) a regeneration step in which at least a portion of the laden absorbent obtained from step a) is regenerated in a regenerator to obtain an at least partly regenerated absorbent and a gaseous stream comprising methanol and at least one acid gas;
  c) a recycling step in which at least a substream of the regenerated absorbent from step b) is recycled into the absorption step a);
  d) a condensation step in which a condensate comprising methanol is condensed out of the gaseous stream from step b);
wherein the regenerator additionally comprises a rescrubbing section, and the condensate from step d) is recycled into the regenerator partly in the upper region of the rescrubbing zone or above the rescrubbing zone.

DETAILED DESCRIPTION OF THE INVENTION

A fluid stream comprising methanol and at least one acid gas is introduced into the process of the invention.

The amount of methanol in the fluid stream is preferably in the range from 50 to 5000 ppmv, more preferably 100 to 1000 ppmv and most preferably 200 to 800 ppmv.

The methanol is preferably added to the fluid stream prior to step a). Methanol may alternatively be formed as by-product in the production of the fluid stream prior to step a), for example in the steam reforming of methane.

In addition, the fluid stream used comprises at least one acid gas. The crude natural gas preferably comprises $CO_2$ and/or $H_2S$. As well as $CO_2$ and/or $H_2S$, other acid gases may be present in the crude natural gas, such as COS and mercaptans. In addition, $SO_3$, $SO_2$, $CS_2$ and HCN may also be present.

The content of acid gases in the fluid stream is generally 0.01% to 40% by volume, preferably 0.05% to 15% by volume and more preferably 0.1% to 5% by volume.

In a particular embodiment, the fluid stream introduced into the process of the invention comprises hydrocarbons.

The hydrocarbon content in the fluid stream is generally 60% to 99.9% by volume, preferably 85% to 99.5% by volume and more preferably 95% to 99% by volume.

The hydrocarbons present in the fluid stream preferably comprise 80% to 100% by volume of methane, more preferably 90% to 99.9% by volume and most preferably 95% to 99% by volume of methane.

The fluid stream introduced into the process of the invention may comprise water.

The water content in the fluid stream is generally within a range from >0% by volume up to a content corresponding to the saturation concentration of water in the fluid stream under the existing pressure and temperature conditions.

The fluid stream may, as well as methane, methanol, acid gases and water content, comprise further components such as other gases (N or He), mercury or naturally occurring radioactive substances.

The proportion of further components in the fluid stream is generally 0% to 4% by volume, preferably 0.0001% to 3% by volume and most preferably 0.0005% to 1.5% by volume.

The fluid stream may be any fluid stream comprising at least one acid gas and methanol. The fluid stream is preferably crude natural gas. The fluid stream may alternatively be a synthesis gas or a biogas to which methanol has been added, or in the production of which methanol forms as a by-product. The crude natural gas used is generally a crude natural gas from which natural gas condensate and water have been separated by condensation. Natural gas condensate and water can be separated off by any of the methods known to the person skilled in the art, for example by lowering the temperature of the crude natural gas being conveyed and separating the condensed constituents, such as water and the natural gas condensate, from the uncondensed constituents of the crude natural gas.

Preference is given to using a fluid stream having a total pressure in the range from 20 to 120 bar, more preferably 40 to 100 bar and most preferably 50 to 80 bar.

Absorption Step:

According to the invention, the fluid stream is introduced into an absorption step in which the fluid stream is contacted with an absorbent in an absorber to obtain an absorbent laden with methanol and acid gases and an at least partly deacidified fluid stream.

Absorbent:

The absorbent comprises at least one amine.
The following amines are preferred:
i) amines of the formula I:

(I)

in which $R^1$ is selected from $C_2$-$C_6$-hydroxyalkyl groups, $C_1$-$C_6$-alkoxy-$C_2$-$C_6$-alkyl groups, hydroxy-$C_1$-$C_6$-alkoxy-$C_1$-$C_6$-alkyl groups and 1-piperazinyl-$C_2$-$C_6$-alkyl groups, and $R^2$ is independently selected from H, $C_1$-$C_6$-alkyl groups and $C_2$-$C_6$-hydroxyalkyl groups;

ii) amines of the formula II:

(II)

in which $R^3$, $R^4$, $R^5$ and $R^6$ are independently selected from H, $C_1$-$C_6$-alkyl groups, $C_2$-$C_6$-hydroxyalkyl groups, $C_1$-$C_6$-alkoxy-$C_1$-$C_6$-alkyl groups and $C_2$-$C_6$-aminoalkyl groups, and X is a $C_2$-$C_6$-alkylene group, —$X^1$—$NR^7$—$X^2$— or —$X^1$—O—$X^2$—, in which $X^1$ and $X^2$ are independently $C_2$-$C_6$-alkylene groups and $R^7$ is H, a $C_1$-$C_6$-alkyl group, $C_2$-$C_6$-hydroxyalkyl group or $C_2$-$C_6$-aminoalkyl group;

iii) 5- to 7-membered saturated heterocycles which have at least one nitrogen atom in the ring and may comprise one or two further heteroatoms selected from nitrogen and oxygen in the ring, and iv) mixtures thereof.

Specific examples of amines usable with preference are:
i) 2-aminoethanol (monoethanolamine), 2-(methylamino)ethanol, 2-(ethylamino)ethanol, 2-(n-butylamino)ethanol, 2-amino-2-methylpropanol, N-(2-aminoethyl)piperazine, methyldiethanolamine, ethyldiethanolamine, dimethylaminopropanol, t-butylaminoethoxyethanol (TBAEE), 2-amino-2-methylpropanol, diisopropanolamine (DIPA);
ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine, tetramethylhexamethylenediamine;
iii) piperazine, 2-methylpiperazine, N-methylpiperazine, 1-hydroxyethylpiperazine, 1,4-bishydroxyethylpiperazine, 4-hydroxyethylpiperidine, homopiperazine, piperidine, 2-hydroxyethylpiperidine and morpholine; and
iv) mixtures thereof.

In a preferred embodiment, the absorbent comprises at least one of the amines
monoethanolamine (MEA), methylaminopropylamine (MAPA), piperazine (PIP), diethanolamine (DEA), triethanolamine (TEA), diethylethanolamine (DEEA), diisopropanolamine (DIPA), aminoethoxyethanol (AEE), tert-butylaminoethoxyethanol (TBAEE), dimethylaminopropanol (DIMAP) and methyldiethanolamine (MDEA) or mixtures thereof.

Further amines that may be introduced into the process are tert-butylaminopropanediol, tert-butylaminoethoxyethylmorpholine, tert-butylaminoethylmorpholine, methoxyethoxyethoxyethyl-tert-butylamine, tert-butylaminoethylpyrrolidone.

The amine is preferably a sterically hindered amine or a tertiary amine. A sterically hindered amine is a secondary amine in which the amine nitrogen is bonded to at least one secondary carbon atom and/or at least one tertiary carbon atom; or a primary amine in which the amine nitrogen is bonded to a tertiary carbon atom. A preferred sterically hindered amine is t-butylaminoethoxyethanol. A preferred tertiary amine is methyldiethanolamine.

If the aim is to remove the $CO_2$ present in the fluid stream completely or virtually completely, the absorbent preferably additionally comprises an activator when the amine present in the absorbent is a sterically hindered amine or a tertiary amine. The activator is generally a sterically unhindered primary or secondary amine. In these sterically unhindered amines the amine nitrogen of at least one amino group is bonded only to primary carbon atoms and hydrogen atoms. If the aim is merely to remove a portion of the gases present in the fluid stream, for example the selective removal of $H_2S$ from a fluid stream comprising $H_2S$ and $CO_2$, the absorbent preferably does not comprise any activator.

The sterically unhindered primary or secondary amine which can be used as activator is selected, for example, from alkanolamines, such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine, polyamines, such as hexamethylenediamine, 1,4-diaminobutane, 1,3-diaminopropane, 3-(methylamino)propylamine (MAPA), N-(2-hydroxyethyl)ethylenediamine, 3-(dimethylamino)propylamine (DMAPA), 3-(diethylamino)propylamine, N,N'-bis(2-hydroxyethyl)ethylenediamine, 5-, 6- or 7-membered saturated heterocycles having at least one NH group in the ring, which may comprise one or two further heteroatoms selected from nitrogen and oxygen in the ring, such as piperazine, 2-methylpiperazine, N-methylpiperazine, N-ethylpiperazine, N-(2-hydroxyethyl)piperazine, N-(2-aminoethyl)piperazine, homopiperazine, piperidine and morpholine.

Particular preference is given to 5-, 6- or 7-membered saturated heterocycles which have at least one NH group in the ring and may comprise one or two further heteroatoms selected from nitrogen and oxygen in the ring. Very particular preference is given to piperazine.

In one embodiment, the absorbent comprises the tertiary amine methyldiethanolamine and the activator piperazine.

The molar ratio of activator to sterically hindered amine or tertiary amine is preferably in the range from 0.05 to 1.0, more preferably in the range from 0.05 to 0.7.

The absorbent generally comprises 10% to 60% by weight of amine.

The absorbent may additionally comprise physical solvents. Suitable physical solvents are, for example, N-methylpyrrolidone, tetramethylenesulfone, oligoethylene glycol dialkyl ethers such as oligoethylene glycol methyl isopropyl ether (SEPASOLV MPE), oligoethylene glycol dimethyl ether (SELEXOL). The physical solvent is generally present in the absorbent in amounts of 1% to 60% by weight, preferably 10% to 50% by weight, especially 20% to 40% by weight.

In a preferred embodiment, the absorbent comprises less than 10% by weight, for example less than 5% by weight, in particular less than 2% by weight of inorganic basic salts, such as potassium carbonate for example.

The absorbent may also comprise additives, such as corrosion inhibitors, antioxidants, enzymes, antifoams etc. In general, the amount of such additives is in the range of about 0.01-3% by weight of the absorbent.

The absorber may be supplied with fresh absorbent, or the absorber may be supplied with absorbent regenerated in the recycling step e). The supply of fresh absorbent means that the components of the absorbent are yet to pass through steps b) to e). The supply of regenerated absorbent requires at least a portion of the components of the absorbent to have passed through steps b) to e).

The absorbent preferably comprises 0.05% by volume or less of methanol, more preferably 0.03% by volume or less of methanol, even more preferably 0.01% by volume or less of methanol and especially 0.005% by volume or less of methanol.

The absorbent is preferably aqueous. This means that the wide variety of different constituents of the absorbent, such as amine, methanol, physical solvents, additives, may be mixed with water in the amounts mentioned above.

Very particular preference is given to using an aqueous solution of methyldiethanolamine as absorbent.

Absorber:

The fluid stream is contacted with the absorbent in step a) in an absorber.

The absorber is preferably an absorption tower or an absorption column, for example a column with random packing or structured packing or a tray column.

The absorber generally comprises an absorption zone and optionally a rescrubbing zone.

Absorption Zone:

The absorption zone is deemed to be the section of the absorption column in which the fluid stream comes into mass transfer contact with the absorbent.

The fluid stream is preferably contacted in countercurrent with the absorbent in the absorption zone.

To improve contact with the absorbent and provide a large mass transfer interface, the absorption zone generally comprises internals, for example random packings, structured packings and/or trays, such as valve trays, bubble-cap trays, Thormann trays or sieve trays.

If the absorption zone comprises random packings or structured packings, the height of the random packings/ structured packings of the absorption zone is preferably in the range from 5 to 20 m, more preferably in the range from 6 to 15 m and most preferably in the range from 8 to 14 m.

If the absorption zone comprises trays, the number of trays in the absorption zone is preferably in the range from 8 to 30, more preferably 12 to 25 and most preferably 15 to 23 trays.

In the case of columns with random packings or structured packings, the absorption zone may be divided into one or more sections, preferably 2 to 4 sections. Bearing and holding trays and/or distributor trays may be disposed between the individual sections of the absorption zone, and these improve the distribution of the absorbent over the entire cross section of the column.

The temperature of the absorbent introduced into the absorption zone is generally about 0 to 60° C., preferably 10 to 50° C. and more preferably 25 to 50° C.

The pressure in the absorber is typically in the range from 30 to 120 bar, more preferably 40 to 100 bar and most preferably 50 to 80 bar has.

The feed point for the fluid stream introduced is preferably below or in the lower region of the absorption zone. The feed is preferably via a gas distributor.

The absorber may comprise one or more feed points for the absorbent introduced. For instance, the absorber may comprise a feed point for fresh absorbent and a feed point for regenerated absorbent. Fresh and regenerated absorbent may alternatively be fed into the absorber together via one feed point. The one or more feed points are preferably above or in the upper region of the absorption zone. It is also possible to feed in individual constituents of the absorbent, such as make-up water, via the feed point for fresh absorbent.

If the absorber has an optional rescrubbing zone, the feed is preferably between the absorber zone and the rescrubbing zone.

The contacting of the fluid stream with the absorbent in the absorption zone affords an at least partly deacidified fluid stream and an absorbent laden with MeOH and acid gases.

In the upper region of the absorber, there is generally a draw point for the deacidified fluid stream. A demister may be mounted in the region of the draw point, in order to separate out any liquid residues of the absorbent or of the scrubbing agent from the exiting fluid stream.

There is generally a draw point for the laden absorbent in the lower region of the absorber, preferably at the bottom.

The at least partly deacidified fluid stream may optionally be contacted with a scrubbing liquid in the absorption zone.

The feed point for the scrubbing agent is preferably in the upper region or above the absorption zone.

The scrubbing liquid is more preferably an aqueous liquid. The scrubbing liquid may be a liquid intrinsic to the process, i.e. an aqueous liquid obtained elsewhere in the process, or aqueous liquids supplied from the outside. Preferably, the scrubbing liquid comprises a condensate (called absorber top condensate) formed in a downstream cooling operation on the deacidified fluid stream and/or fresh water.

By the contacting of the at least partly deacidified fluid stream with a scrubbing liquid, it is possible to scrub out entrained absorbent constituents, such as amines. The contacting with an aqueous scrubbing liquid can additionally improve the water balance of the process when more water is discharged via the exiting streams than is introduced via the entering streams.

Rescrubbing Zone:

The absorber may optionally have what is called a rescrubbing zone. In the rescrubbing zone, a scrubbing liquid is conducted in countercurrent to the deacidified fluid stream.

The rescrubbing zone is generally a section of the absorber above the feed point of the absorbent.

The rescrubbing zone preferably has random packings, structured packings and/or trays to intensify the contact between the fluid stream and the scrubbing liquid. The rescrubbing zone especially has trays, especially valve trays, bubble-cap trays, Thormann trays or sieve trays.

The rescrubbing zone comprises preferably 1 to 7, more preferably 2 to 6 and most preferably 3 to 5 trays, or a packing height (random packings/structured packings) of preferably 1 to 6 m, more preferably 2 to 5 and most preferably 2 to 3 m.

The scrubbing liquid is generally introduced above the rescrubbing zone or into the upper region of the rescrubbing zone. The scrubbing liquids used may be the abovementioned scrubbing liquids.

The scrubbing liquid may be recycled via the rescrubbing zone. This is achieved by collecting the scrubbing liquid below the rescrubbing zone, for example by means of a suitable collection tray, and pumping it to the upper end of the rescrubbing zone by means of a pump. The recycled scrubbing liquid may be cooled, preferably to a temperature of from 20° C. to 70° C., in particular 30° C. to 60° C. This is advantageously achieved by recirculating the scrubbing liquid through a cooler. In order to avoid any accumulation of scrubbed-out absorbent constituents in the scrubbing liquid, a substream of the scrubbing liquid is preferably discharged from the rescrubbing zone.

Specification of the Deacidified Fluid Stream:

The deacidified fluid stream, as described above, is preferably drawn off via a draw point in the upper part of the absorber.

Optionally, the deacidified fluid stream may be guided through a condenser.

Condensers used may, for example, be condensers having cooling coils or helical tubes, plate heat exchangers, jacketed tube condensers and shell and tube heat exchangers.

The condenser is generally operated at a temperature in the range from 10 to 60° C., preferably 20 to 50° C., more preferably 20 to 30° C.

The deacidified fluid stream which is obtained in step a) comprises preferably 0.01 to 10 ppmv of methanol, more preferably 0.05 to 5 ppmv of methanol and most preferably 0.1 to 3 ppmv of methanol.

The water content of the deacidified fluid stream is generally 80-100% of the saturation concentration of water in the fluid stream under the existing temperature and pressure conditions.

If the deacidified fluid stream is to be used as sales gas, the content of $H_2S$ in the deacidified fluid stream is preferably 5 ppmv or less, and the $CO_2$ content is 2% by volume or less.

If the deacidified fluid stream is to be liquefied to LNG, the $CO_2$ content in the deacidified fluid stream is preferably 100 ppmv or less and more preferably 50 ppmv or less. The $H_2S$ content in the deacidified fluid stream in the case of LNG is preferably 5 ppmv or less and more preferably 2 ppmv or less.

Further Processing:

One or more of the following workup steps are optionally conducted subsequently on the deacidified fluid stream which is obtained in step a):

aa) dewatering;
bb) removal of mercury;
cc) removal of nitrogen;
dd) removal of natural gas condensates; and/or
ee) liquefaction (LNG)

The dewatering aa) is preferably conducted in the form of a pressure swing adsorption (PSA) and more preferably in the form of a temperature swing adsorption (TSA), or in the form of a glycol drying operation.

PSA or TSA can be conducted by methods known to the person skilled in the art. Standard variant procedures are described, for example, in Nag, Ashis, "Distillation and Hydrocarbon Processing Practices", PennWell 2016, ISBN 978-1-59370-343-1 or in A. Terrigeol, GPA Europe, Annual Conference, Berlin, Germany, 23rd-25th May, 2012 (https://www.cecachemicas.com/export/sites/ceca/.content/medias/downloads/products/dtm/m olecular-sieves-contaminants-effects-consequences-and-mitigation.pdf).

In PSA or TSA, preference is given to using a zeolite, activated carbon or molecular sieve. Preference is given to using a molecular sieve as solid adsorbent in PSA or TSA.

In the glycol drying operation, preference is given to using a liquid absorbent such as monoethylene glycol (MEG), diethylene glycol (DEG), triethylene glycol (TEG) or tetraethylene glycol (TREG). TEG is especially preferably used as liquid absorbent.

The glycol drying operation can be conducted by process variants known to the person skilled in the art. Examples of glycol drying are likewise found, for example, in Nag, Ashis, "Distillation and Hydrocarbon Processing Practices", PennWell 2016, ISBN 978-1-59370-343-1.

The drying aa) may optionally be followed by further workup steps, such as bb) mercury removal, cc) removal of nitrogen, dd) removal of natural gas condensates and ee) liquefaction of natural gas to give LNG. Details of the aforementioned process steps can likewise be found in Nag, Ashis "Hydrocarbon Processing Practices".

The one or more purification steps aa) to dd) generally afford a fluid stream that meets the specifications of final customers and/or distribution companies and, in the case of natural gas, can be sold as sales gas or can be liquefied in a further liquefaction step ee) to give LNG.

Laden Absorbent:

Step a) additionally affords an absorbent laden with acid gases.

The laden absorbent may be fed directly to the regeneration step b).

Expansion Step (Optional):

In a particular embodiment of the process of the invention, an expansion step is first conducted on the laden absorbent before it is introduced into the regeneration step b).

In the expansion step, the laden adsorbent is generally guided into an expansion vessel.

For this purpose, in general, the laden adsorbent withdrawn at the base of the absorber is expanded through a throttle valve.

Preferably, the laden adsorbent is expanded to a pressure of 3 to 15 bar, preferably 4 to 12 and more preferably 5 to 10 bar.

The expansion generally leads to the desorption of co-absorbed hydrocarbons that go into the gas phase (called flash gas). The flash gas may be guided back into the absorption by means of a compressor, or incinerated for energy generation or flared off in situ.

The expansion vessel is generally a vessel free of any particular internals. The expansion vessel is preferably what is called a flash drum. Alternative expansion vessels include columns having internals, for example random packings, structured packings or trays.

The expansion affords a gaseous phase (flash gas).

In the upper region of the expansion vessel, there is generally a gas draw for the gases converted to the gas phase. A demister may preferably be disposed in turn in the region of the gas draw. If required, the acid gases present may be separated from the flash gas in a further absorption column. Typically, for this purpose, a substream of the regenerated solvent is supplied to the additional absorption column.

At the base of the expansion vessel, in general, the absorbent at least partly laden with the acid gases that have not been converted to the gas phase is drawn off and is generally guided into step b).

Regeneration Step:

According to the invention, the adsorbent at least partly laden with acid gases is guided into the regeneration step b).

In the regeneration step, at least a portion of the laden absorbent obtained from step a) is regenerated in a regenerator to obtain an at least partly regenerated absorbent and a gaseous stream comprising methanol and at least one acid gas. The fluid stream may comprise residual amounts of water which have not been separated off in the rescrubbing zone.

Before being introduced into the regeneration step b), the adsorbent at least partly laden with acid gases is preferably guided through a heat exchanger.

In the heat exchanger, the absorbent at least partly laden with acid gases is preferably heated to a temperature in the range from 50 to 150° C., more preferably 70 to 130° C. and most preferably 80 to 110° C.

In a particular embodiment, the regenerated absorbent drawn from the bottom of the regenerator is used as heating medium in the heat exchanger. This embodiment has the advantage that the thermal energy of the regenerated absorbent from stage b) can be used to heat the laden absorbent. In this way, it is possible to further reduce the energy costs of the overall process.

Regenerator:

According to the invention, the regeneration step is conducted in a regenerator.

The regenerator is generally configured as a stripping column.

The regenerator preferably comprises a regeneration zone and an evaporator.

The regenerator is preferably operated at a top pressure in the range from 1 to 5 bar, preferably 1.2 to 4 and more preferably 1.3 to 2.5 bar.

In the bottom of the regenerator, there is generally disposed a liquid draw for the regenerated solvent.

At the top of the regenerator, there is generally a gas draw for the gaseous stream. A demister is preferably mounted in the region of the gas draw.

According to the invention, the gaseous stream is guided into a condensation step d), as described hereinafter.

Regeneration Zone:

The regenerator generally has a regeneration zone disposed above the bottom and below the rescrubbing zone. In the present context, the regeneration zone is regarded as the region of the regenerator with which the laden absorbent comes into contact with the steam which is raised by the reboiler.

To improve contact and provide a large mass transfer interface, the regeneration zone generally comprises internals, for example random packings, structured packings and/or trays, such as valve trays, bubble-cap trays, Thormann trays or sieve trays.

If the regeneration zone comprises structured packings or random packings, the height of the structured packings/random packings in the regeneration zone is preferably in the range from 5 to 15 m, more preferably in the range from 6 to 12 m and most preferably in the range from 8 to 12 m.

If the regeneration zone comprises trays, the number of trays in the regeneration zone is preferably in the range from 10 to 30, more preferably 15 to 25 and most preferably 17 to 23 trays.

In the case of columns with random packings or structured packings, the regeneration zone may in turn be divided into multiple sections, preferably 2 to 4. Bearing and holding trays and/or distributor trays may be disposed between the sections of the regeneration zone, and these improve the distribution of liquid over the entire cross section of the regenerator.

In general, the laden absorbent is preferably introduced into the regenerator in the upper region or above the regeneration zone and below the rescrubbing zone.

In the regeneration zone, the vapor generated in the evaporator is generally run in countercurrent to the absorbent flowing downward through the regeneration zone.

Bottom:

The zone of the regenerator beneath the regeneration zone is generally referred to as the bottom.

In this region, the regenerated absorbent is typically collected and fed to the evaporator via pipelines via a liquid draw in the lower region of the regenerator and/or partly recycled into the absorber as regenerated absorbent.

The bottom may be divided by a collecting tray disposed between the bottom draw and the feed point for the steam raised in the evaporator.

Evaporator:

In general, at least a portion of the regenerated absorbent is guided from the bottom draw of the regenerator into an evaporator.

Preferably, the bottom draw from the regenerator is guided completely into the evaporator. The evaporator is typically a reboiler (kettle evaporator), natural circulation evaporator (thermosiphon) or forced circulation evaporator.

The evaporator of the regenerator is preferably disposed outside the regenerator and connected to the bottom draw via pipelines.

The evaporator is generally operated at temperatures in the range from 100 to 150° C., preferably 105 to 140° C. and most preferably 110 to 130° C.

In the evaporator, in general, at least a portion of the bottom draw is evaporated and returned to the regenerator. The steam raised and unevaporated liquid are preferably fed in beneath the regeneration zone, preferably into the bottom of the regenerator.

If an additional collecting tray is disposed in the bottom, the steam raised is preferably fed in beneath the collecting tray.

Rescrubbing Zone:

According to the invention, the regenerator has a rescrubbing zone above the regeneration zone, especially preferably above the feed point for the laden absorbent.

The rescrubbing zone generally takes the form of a section of the regenerator disposed above the regeneration zone.

The rescrubbing zone preferably has internals, especially random packings, structured packings and/or trays to intensify the contact between the fluid stream and the scrubbing liquid. Particularly preferably, the scrubbing section has trays, especially valve trays or bubble-cap trays.

In a preferred embodiment, the internals are random packings and/or structured packings. The packing height (random packings/structured packings) is preferably within a range from 1 to 10, more preferably 2 to 8 and most preferably 3 to 6 m.

In a very particularly preferred embodiment, the rescrubbing zone has trays, especially valve trays or bubble-cap trays, the number of trays preferably being in the range from 3 to 20, more preferably 4 to 16 and most preferably 6 to 12 trays.

In addition to the recycled condensate from stage d), a scrubbing liquid may be introduced into the upper region of the rescrubbing zone or above the rescrubbing zone.

The scrubbing liquid used is generally an aqueous or slightly acidic aqueous solution, especially water. The temperature of the scrubbing liquid is generally in the range from 10 to 60° C., preferably in the range from 20 to 55° C. and more preferably 30 to 40° C.

In the rescrubbing zone, entrained residual amounts of amines may be scrubbed out of the absorbent, such that the acidic offgas leaving the regenerator is essentially free of amines. In the rescrubbing zone, the water content of the gas stream which is obtained at the top of the regenerator may additionally be reduced since the contact with the colder scrubbing agent can result in condensation of a portion of the vaporous water. This has the advantage that this water need not be removed in a subsequent distillation step and the gaseous stream which is present at the top of the regenerator has a higher methanol content. The rescrubbing zone thus enables enrichment of methanol in the gaseous stream, such that there is no need to separate it off in a downstream column, and a downstream condensation step is instead sufficient to obtain methanol in a purity that enables it to be used as inhibitor again.

Recycling Step c):

According to the invention, the regenerated absorbent obtained at the bottom of the regenerator from step b) is returned to the absorption step a).

The regenerated absorbent is recycled here, as described above, in one of the feed points of the absorber for the regenerated absorbent.

Condensation Step d):

According to the invention, the gaseous stream from the regenerator is introduced into a condensation step d).

In the condensation step, a condensate comprising methanol is condensed out of the gaseous stream from step b) (condensate outlet). The condensate may also comprise water which has not been separated off in the rescrubbing section. The uncondensed gas phase is preferably discharged from the process as offgas (offgas).

The condensation step is preferably conducted in such a way that the gaseous stream from stage b) is guided through one or more condensers (regenerator top condensers).

The top condensers generally comprise a heat exchanger and a vessel in which the liquid phase can be separated from the gas phase (phase separation vessel). However, heat exchanger and vessel may also be integrated in one component.

The regenerator top condenser is generally operated in such a way that methanol and any water present condense, while the acid gases remain predominantly in the gas phase.

Regenerator top condensers used may, for example, be condensers having cooling coils or helical tubes, jacketed tube condensers and shell and tube heat exchangers.

The regenerator top condenser is generally operated at a temperature in the range from 10 to 60° C., preferably 20 to 55° C., more preferably 30 to 40° C.

In a preferred embodiment, the gaseous stream from stage b) is guided through one regenerator top condenser.

In a further preferred embodiment, the gaseous stream from stage b) is guided through two regenerator top condensers.

Preferably, the first two regenerator top condenser is cooled with air or cooling water and the second two regenerator top condenser is cooled with a coolant.

The first regenerator top condenser is generally operated at a temperature in the range from 20 to 60° C. and preferably 25 to 45° C.

The second regenerator top condenser is generally operated with a coolant at a temperature in the range from 3 to 20° C., preferably 5 to 15° C., more preferably 5 to 10° C.

The embodiment with at least two top condensers has the advantage that the top condensate from the second top generator has a higher methanol content and is thus generally reused as inhibitor in the crude natural gas without additional workup. This embodiment with at least two top condensers also has the advantage that the methanol content in the acidic offgas can be reduced since more methanol can be condensed out at lower temperatures. This can increase the methanol recovery rate, for example to more than 80%, based on the methanol introduced into the process.

Recycling of the Condensate from Step d) into the Rescrubbing Zone of the Regenerator:

According to the invention, a portion of the condensate from the condensation step d) is recycled into the regeneration step b).

A portion of the condensate from the condensation step d) is discharged from the process and constitutes the methanol recovered.

The reflux ratio based on the condensate stream (ratio of condensate recycled to condensate discharged from the process) is preferably in the range from 5 to 100, more preferably in the range from 10 to 70, even more preferably in the range from 12 to 40 especially preferably in the range from 15 to 38.

According to the invention, the condensate from condensation step d) is introduced in the upper region or above the rescrubbing zone of the regenerator in step b).

It is optionally possible to additionally introduce a scrubbing liquid, as described above, into the regenerator together with the condensate from stage d). The introduction can be effected via the same feed point. Scrubbing liquid can alternatively be introduced via a separate feed point.

Apparatuses:

Preferred apparatuses in which the process of the invention can be performed are depicted in schematic form in FIGS. 1 to 4.

Figure 1:
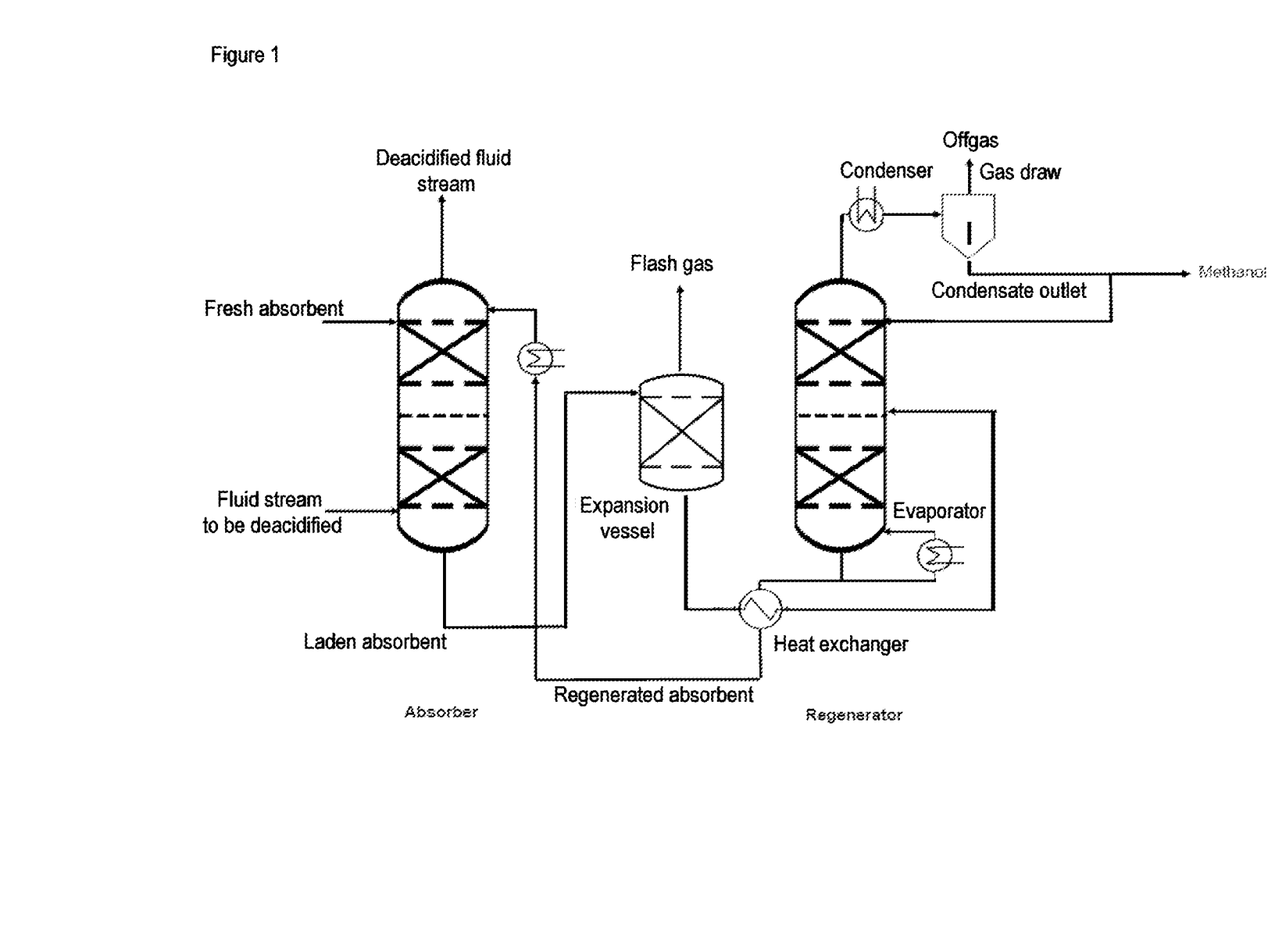
FIG. 1 show an embodiment according to the instant disclosure of the regenerator comprising a top condenser.
Figure 3:
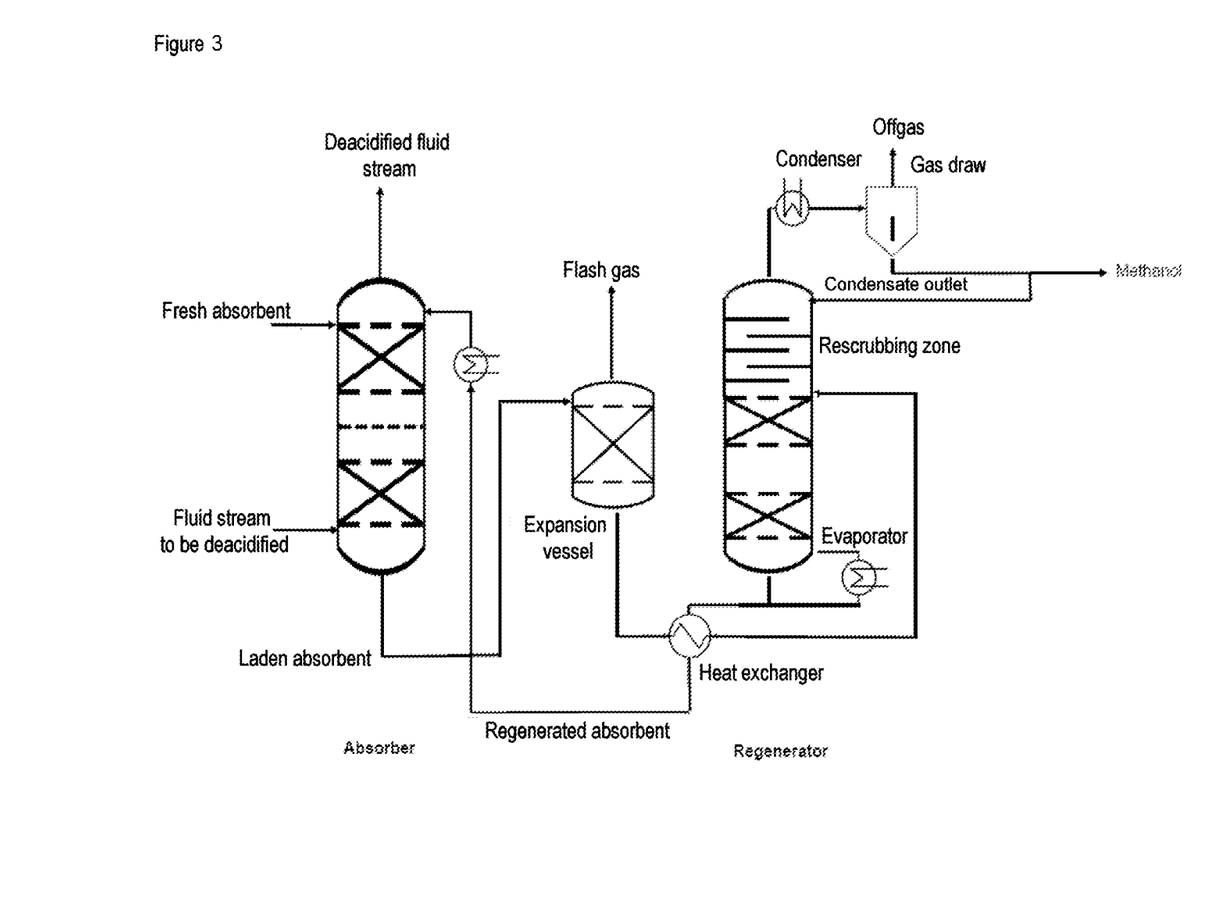
FIG. 3 show an embodiment according to the instant disclosure of the regenerator comprising a top condenser.

FIGS. 1 and 3 show an embodiment in which the regenerator comprises a top condenser.

Figure 2:
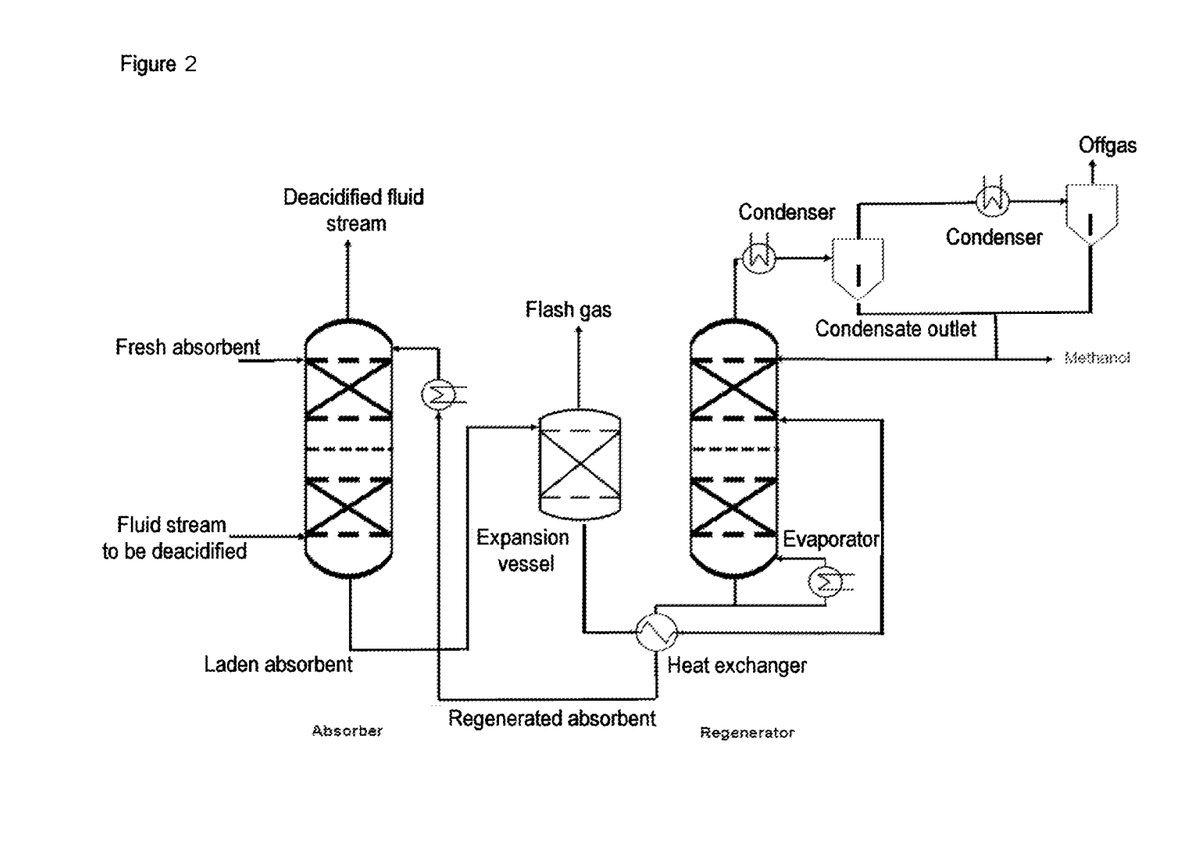
FIG. 2 shows an embodiment according to the instant disclosure of the regenerator comprising two top condensers.
Figure 4:
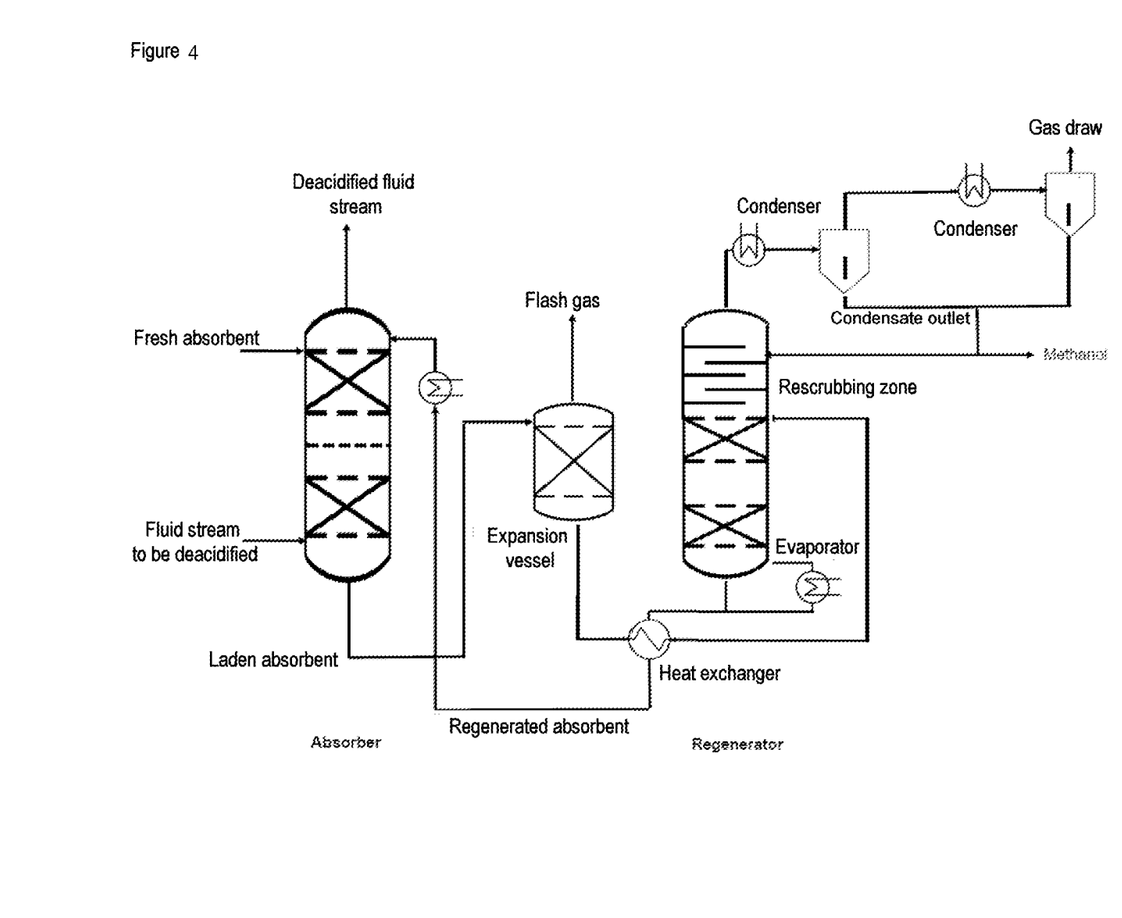
FIG. 4 shows an embodiment according to the instant disclosure of the regenerator comprising two top condensers.

FIG. 2 and FIG. 4 show a preferred embodiment in which the regenerator additionally comprises two top condensers.

In FIGS. 1 to 4 the absorber is configured as an absorption column.

The absorption column preferably has an absorption zone. In the context of the present invention, the absorption zone is deemed to be the section of an absorption column in which the fluid stream comes into mass transfer contact with the absorbent. To improve contact and provide a large mass transfer interface, the absorption zone preferably comprises internals, preferably random packings, structured packings and/or trays.

In a column having random packing or structured packing, the absorption zone is preferably divided into two to four packing sections arranged one on top of another that are separated from one another by bearing and holding trays and/or a distributor tray.

If the absorption zone comprises random packings or structured packings, the height of the structured packings/random packings in the absorption zone is preferably in the range from 5 to 20 m, more preferably in the range from 6 to 15 m and most preferably in the range from 8 to 14 m.

If the absorption zone comprises trays, the number of trays in the absorption zone is preferably in the range from 8 to 30, more preferably 12 to 25 and most preferably 15 to 23 trays.

Below or in the lower region of the absorption zone, there is a feed for the fluid stream to be deacidified.

Fresh absorbent can be fed in via a feed point in the upper region or above the absorption zone.

The supply of fresh absorbent may also include the supply of individual constituents of the absorbent, such as make-up water.

Regenerated absorbent may be fed in via the same feed point or a separate feed point which is likewise in the upper region or above the absorption zone.

Above the absorption zone, preferably at the top of the absorption column, there is preferably a draw point for the deacidified fluid stream.

A demister is preferably mounted in the region of the draw point for the deacidified fluid stream.

In a particularly preferred embodiment, there is a feed point for scrubbing agent in the upper region or above the absorption zone.

In a very particular embodiment, the absorber comprises an additional rescrubbing zone above the absorption zone.

The rescrubbing zone is generally configured as a section of the absorber in the form of a rectifying section disposed above the feed point for the absorbent. The rescrubbing zone preferably has random packings, structured packings and/or trays to intensify the contact between the fluid stream and the scrubbing liquid. The rescrubbing zone especially has trays, especially valve trays, bubble-cap trays, Thormann trays or sieve trays.

There is preferably a feed point for scrubbing agent above the rescrubbing zone.

The rescrubbing zone comprises preferably 1 to 7, more preferably 2 to 6 and most preferably 3 to 5 trays, or a packing height (random packings or structured packings) of preferably 1 to 6 m, more preferably 2 to 5 and most preferably 2 to 3 m.

A collecting tray may be disposed beneath the rescrubbing zone, on which scrubbing liquid can be collected and recycled. The recycling is generally effected here by means of a pump that pumps the scrubbing liquid from the collecting tray to the feed point. In the case of recycling, the scrubbing liquid may be cooled by means of a heat exchanger.

There is preferably a liquid draw for the laden absorbent in the lower region of the absorber.

In a preferred embodiment, there is a heat exchanger between the liquid draw for the laden absorbent in the absorber and the feed for the laden absorbent in the regenerator. The heating medium used for this heat exchanger is preferably the recycle stream of the regenerated absorbent from the bottom of the regenerator to the absorber. In this preferred embodiment, the energy demand of the overall process can be reduced.

In FIGS. 1 to 4, the liquid draw from the absorber is connected via a heat exchanger to the regenerator b) via pipelines.

The heat exchanger may be configured as a plate heat exchanger or shell and tube heat exchanger. The heating medium used in the heat exchanger is preferably the bottom stream from the regenerator b).

The regenerator in FIGS. 1 to 4 additionally comprises a regeneration zone, an evaporator, a feed for the laden absorbent, a liquid draw in the bottom of the regenerator, a rescrubbing zone and a draw point (gas draw) in the top region of the regenerator.

In the present context, the regeneration zone is regarded as the region of the regenerator with which the laden absorbent comes into contact with the steam which is raised by the reboiler.

To improve contact and provide a large mass transfer interface, the regeneration zone comprises internals, preferably random packings, structured packings and/or trays.

In a column having random packing or structured packing, the regeneration zone is preferably divided into two to four packing sections arranged one on top of another that are separated from one another by bearing and holding trays and/or a distributor tray.

If the regeneration zone comprises random packings or structured packings, the height of the random packings/structured packings in the regeneration zone is preferably in the range from 5 to 15 m, more preferably in the range from 6 to 12 m and most preferably in the range from 8 to 12 m.

If the regeneration zone comprises trays, the number of trays in the regeneration zone is preferably in the range from 10 to 30, more preferably 15 to 25 and most preferably 17 to 23 trays.

The feed for the laden absorbent is generally above or in the upper region of the regeneration zone.

The regenerator in FIGS. 1 to 4 additionally comprises an evaporator.

The evaporator is preferably a reboiler, natural circulation evaporator or forced circulation evaporator.

The evaporator is preferably connected to a liquid draw at the bottom of the regenerator via a pipeline. The bottom generally refers to the region beneath the regeneration zone.

The vapor-liquid mixture generated in the evaporator is preferably introduced into the lower region of the regenerator via a feed point above the liquid draw at the bottom but below the regeneration zone.

In a further preferred embodiment, the bottom of the regenerator is divided by a collecting tray.

The absorbent collected therein is supplied to the heat exchanger. The steam is fed in and the liquid is recycled beneath the collecting tray.

The regenerator in FIGS. 1 to 4 additionally comprises a draw point for the gaseous stream formed in the regeneration. The draw point for the gaseous stream formed in the regeneration is preferably disposed in the top region of the regenerator. There is preferably a demister in the region of the draw point.

The regenerator in FIGS. 1 to 4 further comprises a rescrubbing zone having internals.

In FIGS. 1 and 2, the internals present in the rescrubbing zone are structured packings or random packings, where the packing height (random packings/structured packings) is preferably in the range from 1 to 10 m, more preferably 2 to 8 and most preferably in the range from 3 to 6 m.

In FIGS. 3 and 4, the internals present in the rescrubbing zone are trays. More particularly, the number of trays is preferably in the range of 3 to 20, more preferably 4 to 16 and is preferably 6 to 12. The trays in the scrubbing section may for example be valve trays, bubble-cap trays, Thormann trays or sieve trays.

In FIGS. 1 to 4, there may be a separate feed for scrubbing liquid above or in the upper region of the rescrubbing zone. If scrubbing liquid, such as freshwater, is additionally supplied, it is preferable to guide this scrubbing liquid into the regenerator together with the condensate from step d). In FIGS. 1 to 4, the draw point for the gaseous stream formed in the regeneration is connected to a top condenser.

In FIGS. 1 and 3, the top condenser comprises a heat exchanger, a vessel for phase separation (phase separation vessel), a gas draw and a condensate outlet.

Condensers used may, for example, be condensers having cooling coils or helical tubes, jacketed tube condensers and shell and tube heat exchangers.

FIGS. 2 and 4 show a preferred embodiment which comprises two condensers with one heat exchanger, phase separation vessel, gas draw and one condensate outlet each. In this embodiment, the first condenser is preferably cooled with air or cooling water and the second condenser is preferably cooled with a coolant. These embodiments have the advantage that the methanol content in the acidic offgas can be reduced since more methanol can be condensed out. This can increase the methanol recovery rate, for example to more than 80%, based on the methanol introduced into the process.

In FIGS. 1 to 4, the regenerator additionally has, in the upper region or above the rescrubbing zone, a feed which is connected to a condensate outlet of a top condenser d).

In FIGS. 1 to 4, the preferred apparatus additionally comprises an expansion vessel.

The expansion vessel is connected to the absorber a) and the regenerator b).

The liquid draw from the bottom of the absorber is preferably connected via a valve to the expansion vessel.

In the expansion vessel, at least a portion of the acid gases in the laden absorbent is converted to the gas phase and separated from the unevaporated liquid phase.

The gas phase is generally drawn off as acidic offgas in the upper region of the expansion vessel and discharged from the process.

In the lower region of the expansion vessel, there is preferably a liquid draw for the unevaporated liquid phase which is connected to the regenerator via a pipeline. The feed point for the liquid phase from the expansion vessel is preferably above the regeneration zone.

More preferably, a heat exchanger is disposed between the expansion vessel and the regenerator, which is operated with the bottoms discharge from the regenerator as heating medium.

The apparatuses represented in FIGS. 1 to 4 can be operated according to the above-described process conditions.

Advantages:

The apparatus of the invention, the inventive use thereof and the process of the invention have the advantage over the processes known from the prior art, in which the condensation from the condensation step d) is subjected to a further distillation, that it is possible to dispense with one distillation column.

The process of the invention additionally has the advantage that the methanol fed in as inhibitor can be recovered at a high rate, preferably more than 80%, based on the methanol fed in. This can further reduce the operating costs of the overall process.

The regenerated absorbent thus has such a low content of methanol that the methanol which is introduced into step a) with the fluid stream to be deacidified can be removed virtually completely. It is thus possible to optimally utilize recycle streams and to reduce the supply of constituents of the absorbent to compensate for losses.

The removal of the methanol from the deacidified fluid stream has the advantage that the problems that occur in the presence of methanol can be reduced in downstream workup steps.

If the subsequent dewatering is configured, for example, as a PSA or TSA in which a molecular sieve is used as a solid desiccant, a 3 A molecular sieve rather than a 4 A molecular sieve are used, since the adsorption of water does not compete with the adsorption of methanol. As a result, there is also no absorption of further components, such as $H_2S$ and ethane. This enables a smaller design of the dewatering stage. In the case of regeneration of the molecular sieve by increasing the temperature, a low methanol content leads to low carbonization of the molecular sieve.

If the glycol drying is configured, for example, as what is called a TEG unit (TEG=triethylene glycol), the presence of methanol makes it difficult to regenerate TEG. These disadvantages can likewise be reduced by the process of the invention or the apparatus of the invention and the use thereof.

In both cases (PSA/TSA and glycol drying), the entrainment of methanol through multiple plant components is reduced. More particularly, the water removed in the regeneration of the desiccant comprises less methanol, as a result of which it is optionally possible to reduce or avoid the complexity involved in a further workup of the water removed.

EXAMPLES

The invention is illustrated by the following examples:

The examples are based on calculations performed using a simulation model. The phase equilibria were described using a model by Pitzer (K. S. Pitzer, Activity Coefficients in Electrolyte Solutions 2nd ed., CRC Press, 1991, Chapter 3, Ion Interaction Approach: Theory). The simulation of the absorption processes is described by means of a mass transfer-based approach; details of this are given in Asprion (Asprion, N.: Nonequilibrium Rate-Based Simulation of Reactive Systems: Simulation Model, Heat Transfer, and Influence of Film Discretization, Ind. Eng. Chem. Res. (2006) 45(6), 2054-2069). The design of the distillation column and the separation of water and methanol at the top of the regenerator were effected by means of a thermodynamic model based on the NRTL approach for the description of the vapor-liquid equilibrium of water-methanol.

All pressures reported in the present document are absolute pressures.

In the present document "$m^3$ (STP)/h" is the volume flow rate reported in standard cubic meters per hour. A standard cubic meter is based on a temperature of 273.15 K and a pressure of 1.01325 bar. All values reported in the unit "% by volume" are likewise based on these conditions.

The absorbent used in all examples is an aqueous amine solution consisting of piperazine and methyldiethanolamine with a total amine content of 40% by weight.

The following process conditions were assumed for all examples:

Feed gas: 0.2% by volume of $CO_2$, 520 ppmv of methanol, balance: hydrocarbons ($CH_4$, $C_2H_6$), at a temperature of 26° C. and a pressure of 63.5 bar.

Absorbent: An amine solution consisting of piperazine and methyldiethanolamine with a total amine content of 40% by weight. 0.1 $m^3$/h of regenerated absorbent is used for every 1000 $m^3$ (STP)/hr of feed gas. The regenerated absorbent has a temperature of 35° C.

The internals in the absorption column are random packings having a total bed height of 14 m.

In the regenerator, random packings are likewise used for the regeneration zone, with a bed height of 10 m. The regenerator is operated at a pressure of 1.5 bar. The rescrubbing section in the regenerator is modeled by 7 theoretical plates.

All examples have to fulfill the same separation task defined in the following specifications:

The methanol content of the deacidified fluid stream (natural gas) which is obtained at the top of the absorber is not to exceed a value of 1 ppmv.

The $CO_2$ content of the deacidified fluid stream (natural gas) which is obtained at the top of the absorber is not to exceed a value of 15 ppmv.

The methanol recovered at the top of the methanol distillation is to have a purity of greater than 96% by weight.

Example 1

A process is simulated in a plant according to FIG. 2 (two condensers). The process consists of an absorption column, an expansion vessel (HP flash), regenerator with evaporator, and two top condensers. The liquid streams (methanol+water) condensed out in the top condenser are combined, and introduced into the rescrubbing section or separated off from the process as methanol with a reflux ratio of 29.

The methanol recovery is 85% based on the amount present fluid stream introduced into stage a).

Comparative Example 1

Figure 5:
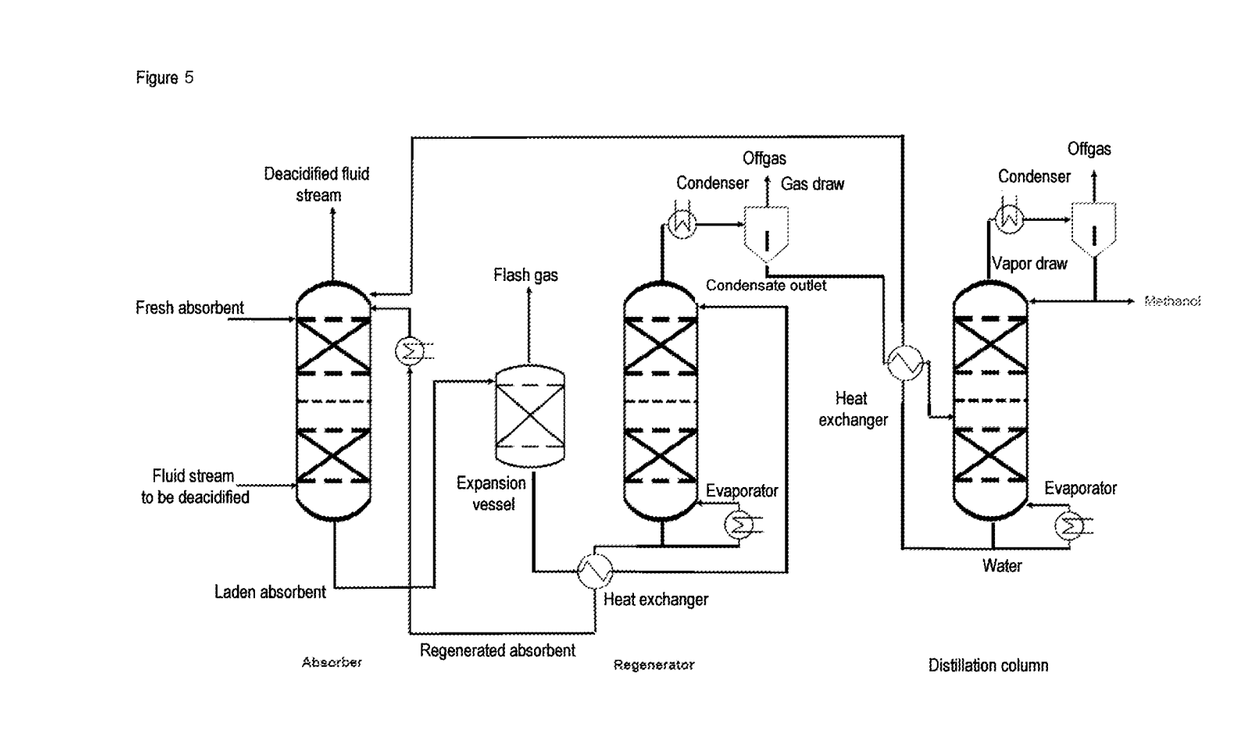
FIG. 5 shows an embodiment according to the prior art.

Based on patent application RU2602908, a further simulation for a process was created according to FIG. 5. The crude gas stream to be purified is identical to the two examples detailed above; the apparatus sizes and evaporator outputs used in the regenerator were also kept constant. In addition to the regenerator, a complete distillation unit with distillation column, evaporator, condenser and additional heat exchanger is also required. In contrast thereto, example 1 only requires one regenerator with an extended rescrubbing section. In other words, the capital costs for example 1 are found to be distinctly more favorable than in the comparative example. While the evaporator output for the regenerator is virtually identical in both cases, the evaporator output of the distillation column additionally has to be raised in the comparative example.

The invention claimed is:

1. A process for producing a deacidified fluid stream from a fluid stream comprising methanol and at least one acid gas, comprising
    a) an absorption step in which the fluid stream is contacted with an absorbent in an absorber to obtain an absorbent laden with methanol and acid gases and an at least partly deacidified fluid stream;
    b) a regeneration step in which at least a portion of the laden absorbent obtained from step a) is regenerated in a regenerator to obtain an at least partly regenerated absorbent and a gaseous stream comprising methanol and at least one acid gas;
    c) a recycling step in which at least a substream of the regenerated absorbent from step b) is recycled into the absorption step a);
    d) a condensation step in which a condensate comprising methanol is condensed out of the gaseous stream from step b);
    wherein the regenerator additionally comprises a rescrubbing section, and the condensate from step d) is recycled into the regenerator partly in the upper region of the rescrubbing zone or above the rescrubbing zone.

2. The process according to claim 1, wherein the rescrubbing zone of the regenerator has internals.

3. The process according to claim 2, wherein the internals are structured packings or fillings and the packing height is in the range from 1 to 10 m.

4. The process according to claim 2, wherein the internals are trays and the number of trays is in the range from 3 to 20.

5. The process according to claim 1, wherein the condensation step d) comprises at least two condensers.

6. The process according to claim 5 wherein the condensation step d) comprises two condensers, the first condenser being cooled with air or cooling water and the second condenser being cooled with a coolant.

7. The process according to claim 1, wherein the regeneration zone of the regenerator comprises structured packings or random packings and the height of the random packings/structured packings in the regeneration zone is in the range from 5 to 15 meters or the regeneration zone comprises trays and the number of trays is in the range from 10 to 30.

8. The process according to claim 1, wherein the fluid stream introduced into the process comprises methanol in the range from 50 to 5000 ppmv.

9. The process according to claim 1, wherein the fluid stream introduced into the process comprises hydrocarbons and the hydrocarbons comprising the range from 90% to 99.5% by volume of methane.

10. The process according to claim 1, wherein the fluid stream introduced into the process comprises acid gases in the range from 0.01% to 40% by volume.

11. The process according to claim 1, wherein an additional expansion step is performed between absorption step a) and regeneration step b).

12. The process according to claim 1, wherein the absorbent is an aqueous absorbent.

13. The process according to claim 1, wherein the condensate from step d) is partly recycled and partly discharged, with the ratio of recycled condensate to discharged condensate in the range from 5 to 100.

14. The process according to claim 1, wherein one or more of the following workup steps are performed on the deacidified fluid stream from step a):
    aa) dewatering;
    bb) removal of mercury;
    cc) removal of nitrogen;
    dd) removal of natural gas condensates; and/or
    ee) liquefaction.

* * * * *